(12) United States Patent
Essinger et al.

(10) Patent No.: US 7,744,127 B2
(45) Date of Patent: Jun. 29, 2010

(54) FUEL TANK MOUNT

(75) Inventors: Reiner Essinger, Lauteral (DE);
Thomas Guelll, Huenfelden (DE);
Thorsten Schuetz, Selzen (DE); Mirko Schwan, Mittenaar (DE)

(73) Assignee: GM Global Technology Operations, Inc., Detroit, MI (US)

( * ) Notice: Subject to any disclaimer, the term of this patent is extended or adjusted under 35 U.S.C. 154(b) by 362 days.

(21) Appl. No.: 11/536,744

(22) Filed: Sep. 29, 2006

(65) Prior Publication Data

US 2008/0078598 A1    Apr. 3, 2008

(51) Int. Cl.
*B60P 3/22*    (2006.01)
(52) U.S. Cl. .................. 280/830; 280/831; 280/833; 220/675
(58) Field of Classification Search .......... 280/830, 280/831, 834, 781, 783, 790; 296/37.1, 37.14; 220/581, 23.2, 586, 675, 564
See application file for complete search history.

(56) References Cited

U.S. PATENT DOCUMENTS

| | | | | |
|---|---|---|---|---|
| 3,552,599 | A * | 1/1971 | Redding | 220/675 |
| 4,401,309 | A * | 8/1983 | Matsuzaki et al. | 280/835 |
| 4,449,723 | A * | 5/1984 | Shiratsuchi | 280/833 |
| 4,886,180 | A | 12/1989 | Bonczyk | |
| 5,490,549 | A * | 2/1996 | Biette | 296/78.1 |
| 5,577,630 | A * | 11/1996 | Blair et al. | 220/581 |
| 5,676,180 | A * | 10/1997 | Teel | 141/18 |
| 5,794,979 | A * | 8/1998 | Kasuga et al. | 280/834 |
| 5,884,380 | A * | 3/1999 | Thurm | 29/401.1 |
| 5,997,040 | A * | 12/1999 | Fukagawa et al. | 280/834 |
| 6,042,071 | A * | 3/2000 | Watanabe et al. | 280/834 |
| 6,086,103 | A * | 7/2000 | Fukagawa et al. | 280/830 |
| 6,105,701 | A * | 8/2000 | Buell | 180/229 |
| 6,237,710 | B1 * | 5/2001 | Mori et al. | 280/835 |
| 6,257,360 | B1 * | 7/2001 | Wozniak et al. | 280/831 |
| 6,341,792 | B1 * | 1/2002 | Okuma | 280/304.3 |
| 6,478,335 | B2 * | 11/2002 | Reed | 280/835 |
| 6,641,169 | B2 * | 11/2003 | Fukunaga et al. | 280/835 |
| 6,672,620 | B2 * | 1/2004 | Kawazu et al. | 280/834 |
| 6,736,229 | B1 * | 5/2004 | Amori et al. | 280/834 |
| 6,824,168 | B2 * | 11/2004 | Kawazu et al. | 280/834 |
| 6,886,861 | B2 * | 5/2005 | Marsala et al. | 280/834 |

(Continued)

FOREIGN PATENT DOCUMENTS

DE    2045961    3/1972

(Continued)

*Primary Examiner*—Hau V Phan
(74) *Attorney, Agent, or Firm*—Reising Ethington P.C.

(57) ABSTRACT

A fuel tank assembly includes a fuel tank, a bracket carried by the fuel tank and having a portion accessible from the outside of the fuel tank to permit the assembly to be mounted to a vehicle, and an outer layer disposed around at least part of the fuel tank and a portion of the bracket to connect the bracket to the fuel tank. In one implementation, the fuel tank includes layers of composite material that have fibers embedded in resin or the like. The bracket is carried or trapped between adjacent layers of the composite material so that the bracket is fixed to the tank. The bracket preferably is connected to the tank at one end and is flexible in at least one direction to accommodate changes in the shape or dimensions of the fuel tank.

23 Claims, 2 Drawing Sheets

U.S. PATENT DOCUMENTS

| | | | |
|---|---|---|---|
| 6,896,293 B2 * | 5/2005 | Philipps et al. | 280/833 |
| 7,063,355 B2 * | 6/2006 | Hashimura | 280/830 |
| 7,264,277 B2 * | 9/2007 | Ono et al. | 280/830 |
| 7,270,209 B2 * | 9/2007 | Suess | 296/37.1 |
| 2005/0247501 A1 * | 11/2005 | Baker | 180/219 |

FOREIGN PATENT DOCUMENTS

| | | |
|---|---|---|
| DE | 2357145 B2 | 5/1974 |
| DE | 4229717 A1 | 3/1994 |
| DE | 10203556 A1 | 9/2003 |
| EP | 0879726 A2 | 11/1998 |

* cited by examiner

FUEL TANK MOUNT

TECHNICAL FIELD

The present invention relates generally to fuel storage tanks and more particularly to an assembly including a fuel tank and a mount for fuel tanks.

BACKGROUND

There is an increasing demand for vehicles powered by fuels other than liquid gasoline. Common fuels proposed as alternatives to liquid gasoline include natural gas and hydrogen. Such fuels can be stored in liquid or in high pressure gaseous form. To provide a desired stored volume or capacity of compressed gaseous fuel, higher tank pressures are required. Accordingly, the fuel tank must be able to withstand the relatively high pressure of fuel to be stored therein, and also be of a suitable size and weight to facilitate carrying the tank or tanks on a vehicle.

SUMMARY

A fuel tank assembly includes a fuel tank defining an interior in which a supply of fuel is stored, a bracket carried by the fuel tank and having a portion accessible from the outside of the fuel tank to permit the assembly to be mounted to a vehicle, and an outer layer disposed around at least part of the fuel tank and a portion of the bracket to connect the bracket to the fuel tank. In one implementation, the fuel tank includes layers of composite material that have fibers embedded in resin or the like. The bracket is carried or trapped between adjacent layers of the composite material so that the bracket is fixed to the tank. The bracket preferably is connected to the tank at one end, to the vehicle at its other end, and is flexible and resilient in at least one direction to accommodate changes in the shape or dimensions of the fuel tank such as may occur due to the changing fuel pressure within the fuel tank in use.

In another implementation, a fuel tank assembly may be connected directly to a portion of the vehicle support structure or frame. The fuel tank assembly may define part of or all of a structural member of the vehicle, thereby reducing the structural members needed in the frame which may result in weight or cost savings, for example.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of certain presently preferred embodiments is merely exemplary in nature and is not intended to limit the invention, its application, or uses.

Figure 1:
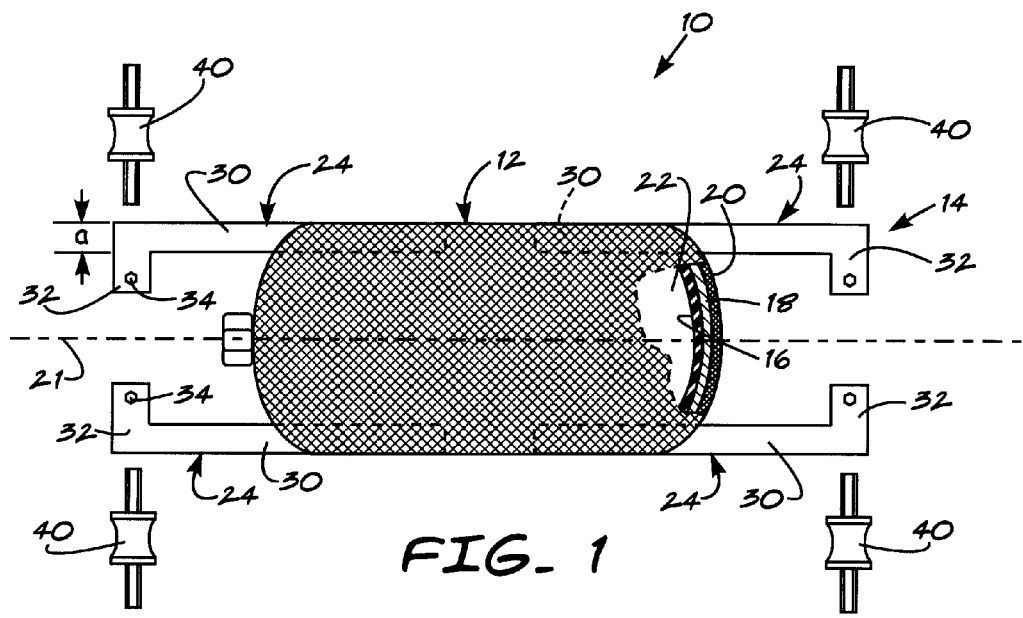
FIG. 1 is a side view of one presently preferred embodiment of a fuel tank assembly including an integrated mount assembly.

Referring in more detail to the drawings, FIG. 1 illustrates one presently preferred implementation of a fuel tank assembly 10 including a fuel tank 12 and a mount assembly 14. The fuel tank 12 may be adapted for containing and storing alternative fuels including, by way of example without limitation, natural gas or hydrogen. The fuel within the tank may be stored at a relatively high pressure, such as about 70 MPa in one exemplary hydrogen application. Accordingly, the fuel tank is preferably constructed to accommodate high pressure fuels, although other tank designs and strengths may be employed.

The fuel tank 12 may be of a composite construction including an inner liner 16 that may be formed from any suitable material such as a metal or a plastic like high density polyethylene (HDPE). The liner 16 is wrapped or covered with layers of epoxy impregnated carbon and/or glass fibers 18. Because the carbon fibers are relatively expensive and susceptible to being damaged from chemical or environmental attack, or by physical abrasions or impact from handling and in use, a less expensive, and durable glass or fiberglass outer wrapping or layers 20 are preferably disposed about and over the carbon and glass inner layers 18. The outer layers 20 may be wrapped continuously around the periphery of the tank along at least a portion of the length or axial extent of the tank. In the embodiment shown, the fuel tank 12 is generally cylindrical and has a longitudinal axis 21.

The composite shell surrounding the inner liner 16 may be produced by filament winding, or other processes as desired. At one or both ends, an aluminum boss may be disposed in and carried by the composite shell and preferably extends into and communicates with the interior 22 of the inner liner 16 to permit the introduction of fuel into the tank. The aluminum boss is preferably secured in the composite shell and relative to the liner 16 in known manner. So constructed and arranged, the liner 16 provides a high pressure gas barrier for the fuel stored in the interior of the fuel tank, but need not be a structural element of the tank. In some applications, it is desirable that the liner 16 be a relatively flexible or resilient material that is able to transfer substantially all of the loads from the pressurized fuel to the structural composite shell of the tank.

The fuel tank mount 14 preferably includes at least one bracket 24 that is carried by the fuel tank 12 and has at least a portion accessible from the exterior of the fuel tank 12 to facilitate mounting the tank to a vehicle. In one presently preferred implementation, a plurality of separate brackets 24 are provided each of which is partially overwrapped or encased by one or more layers of the fiberglass outer layers 20 and/or the carbon and glass inner layers 18 of the composite tank 12. In this manner, each bracket 24 is rigidly secured to the fuel tank 12 and independently connectable to the vehicle, such as to a side rail or cross member 46 (FIG. 2) of the vehicle frame.

Figure 2:
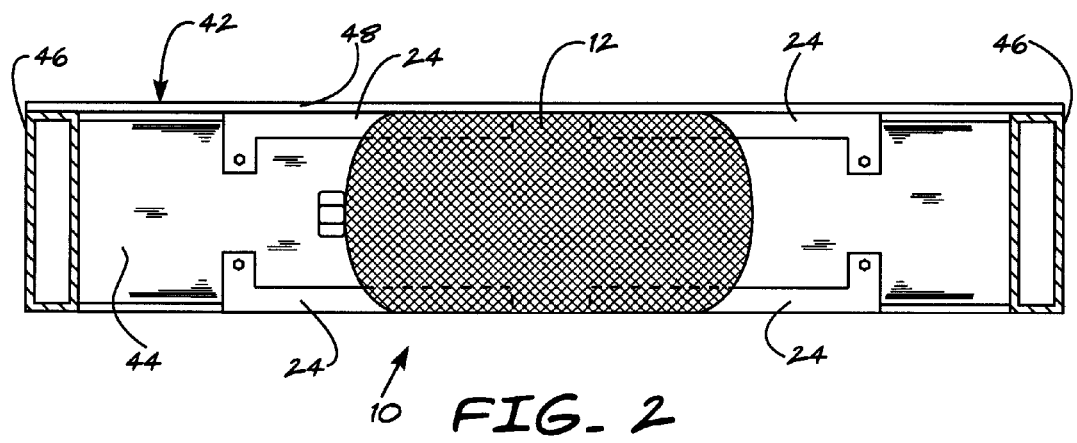
FIG. 2 is a side view of the fuel tank assembly of FIG. 1 shown connected to a portion of a vehicle frame.

In the implementation of FIGS. 1 and 2, four separate brackets 24 are provided. Each bracket 24 may be generally L-shaped having a first arm 30 that is partially overwrapped, laminated to the tank or encased by one or more layers 18, 20 disposed about the exterior of the tank 12, or comprising the exterior layers of the tank itself. The first arm 30 may be contoured to generally conform to the shape of an adjacent portion of the fuel tank 12. The first arm 30 may also extend generally parallel to the axis 21 of the tank 12 and may extend one-half or less of the length of the tank 12. Of course, the brackets 24 may extend along more than one-half of the length of the tank 12 if desired. The other arm or end 32 of each bracket 24, preferably is disposed outside of the tank layers 18, 20 and includes an opening 34 provided to facilitate bolting or otherwise mechanically connecting each bracket to the vehicle. The end 32 is disposed at an acute included angle relative to the arm 30 and may be generally co-planar with the arm 30.

The brackets 24 permit and accommodate changes in tank diameter and shape in use such as may occur as the pressure of fuel within the tank changes. Each first arm 30 and/or entire bracket 24 may have a width 'a' (FIG. 1) that is greater than its thickness (extending into the page as viewed in FIG. 1) so that the brackets 24 are more flexible in one direction than its other. In this way, each bracket 24 can carry or support a greater load or force acting generally along a plane parallel to its width 'a' than along a plane perpendicular thereto. The brackets 24 may be oriented so that forces perpendicular to their width include lateral accelerations which may be accommodated with some flexing of the brackets to dampen these forces. The brackets 24 may also be crimped, bent or otherwise formed or shaped to control their bending or flexing under such loads. If desired, isolators or bumpers 40 may be disposed between the brackets 24 and the vehicle to at least reduce the transmission of force and/or vibrations between the tank 12 and vehicle. In at least some applications, the bumpers 40 can be eliminated and the tank 12 can be mounted directly to the vehicle structure.

The tank assembly 10 may be designed to carry or support loads from the vehicle structure or frame 42 during driving and/or vehicle impact or crash events. As best shown in FIG. 2, the tank assembly 10 can be connected to structural members of the vehicle frame 42, such as to a cross member 44 of the frame that extends between and interconnects two side rails 46 all of which support a floor 48. With the tank assembly 10 connected to or between vehicle structural members, one or more vehicle structural members, for example, the cross member, can be reduced in length (e.g. so that it spans only a portion of the distance between the side rails and the tank assembly spans the remaining distance), in size (e.g. a thinner cross member could be used if the tank assembly bears some of the load) or at least certain portions may be eliminated and replaced by the tank assembly 10 which may result in weight and/or cost reductions in the vehicle generally.

Figure 3:
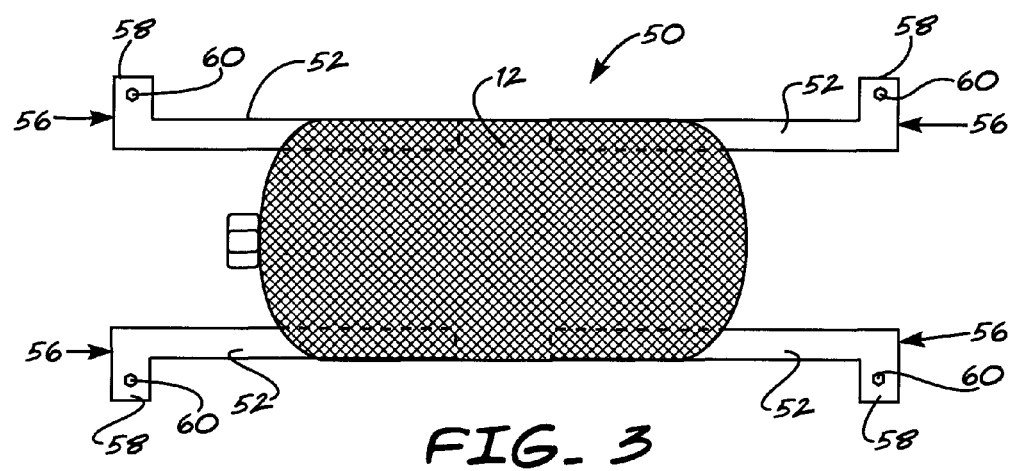
FIG. 3 is a side view of a modified fuel tank and integrated mount assembly.

Another presently preferred implementation of a fuel tank assembly 50 is shown in FIG. 3. The fuel tank assembly 50 includes brackets 52 that are preferably constructed in the same manner as the brackets 24 shown in FIG. 1, may be connected to and carried by the fuel tank 12 in the same manner as set forth with regard to the tank assembly 10 shown in FIG. 1, and may be connected to the vehicle in the same manners set forth with regard to the tank assembly 10. In this tank assembly 50, the brackets 52 are orientated so that the exposed ends 56 have outwardly facing fingers 58 providing a greater distance or span between the openings 60 of adjacent brackets 52 by which the brackets 52 and hence the tank 12 are mounted to the vehicle. Of course, other bracket shapes, constructions or arrangements may be provided to correspond with a desired mounting location or position within or on the vehicle.

Figure 4:
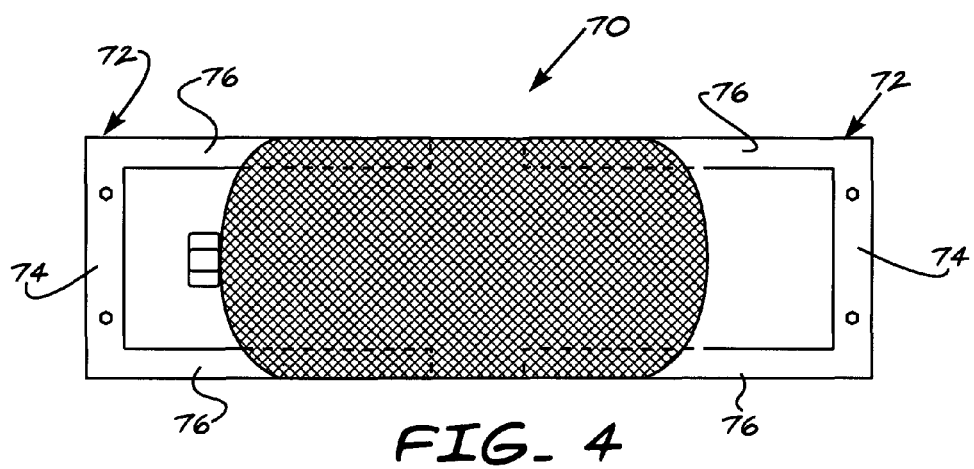
FIG. 4 is a side view of another modified fuel tank and integrated mount assembly.

Another presently preferred implementation of a fuel tank assembly 70 is shown in FIG. 4. In this assembly 70, a pair of generally U-shaped brackets 72 are disposed at opposite ends of the fuel tank 12 with the bight or closed end 74 of the U-shaped brackets 72 being exposed and extending outwardly from the fuel tank ends while generally parallel arms 76 are partially encased in and/or otherwise carried by the fuel tank 12. Each arm 76 preferably extends along the fuel tank 12 and may be connected to or carried by the fuel tank 12 as set forth with regard to the arms 30 of the brackets 24 of FIG. 1 or in any other suitable way such as, by mechanical connection, fasteners, adhesives, or otherwise.

Accordingly, the fuel tank assemblies 10, 50, 70 may be directly integrated into the vehicle and may also function as part of or as a structural member of the vehicle in addition to or in place of one or more other structural members. Otherwise, the fuel tank assemblies 10, 50, 70 can be decoupled or isolated from the vehicle structure such as by bumpers or other isolators. Further, the brackets 24, 52, 72 by which the fuel tank 12 is mounted to the vehicle can be designed to readily accommodate changes in the dimensions of the tank 12 such as changes to the diameter of the tank corresponding to changes of the internal fuel pressure in the tank. Further, the brackets 24, 52, 72 can be securely attached to the tank 12 by disposing a portion of each bracket 24, 52, 72 between layers of the epoxy impregnated fiber material in a composite tank, by wrapping fiberglass or other resinous fiber material over the brackets and about a fuel tank, or by otherwise attaching the brackets to a fuel tank or fuel tank shell. The exposed portions of the brackets can be constructed and arranged as desired for particular vehicle application to facilitate connecting the brackets to the vehicle. The bracket portions connected to or adjacent to the tank can also be constructed and arranged as desired for given application, such as to accommodate the tank shape, support anticipated loads, and the like.

The above description of certain embodiments of the invention is merely exemplary in nature and, thus, variations, modifications and/or substitutions thereof are not to be regarded as a departure from the spirit and scope of the invention. Tank assemblies embodying the present invention may have none, some, or all of the noted features and/or advantages. That certain features are shared among the presently preferred embodiments set forth herein should not be constructed to mean that all embodiments of the present invention must have such features.

What is claimed is:

1. A fuel tank assembly, comprising:
    a fuel tank including an inner liner and a layer wrapped entirely around the inner liner, the inner liner defining an interior in which a supply of gaseous fuel is stored, the layer encasing the inner liner so that the inner liner and the layer contain the gaseous fuel; and
    a bracket carried by the fuel tank and having a first portion accessible from the outside of the fuel tank to permit the assembly to be mounted to a vehicle, wherein
    the layer is wrapped around a second portion of the bracket so that the bracket is carried by the fuel tank.

2. The assembly of claim 1 wherein the layer is defined at least in part by one or more composite layers of fibers and resin, and the bracket is disposed between adjacent composite layers.

3. The assembly of claim 2 wherein the layer is wrapped continuously around the periphery of the liner along at least a portion of the axial extent of the liner.

4. The assembly of claim 1 wherein the layer includes fibers embedded in a resin that rigidly secures the bracket to the fuel tank.

5. The assembly of claim 1 wherein the bracket includes a plurality of brackets each connected to the fuel tank.

6. The assembly of claim 5 wherein each bracket is independently carried by the fuel tank.

7. The assembly of claim 1 wherein the bracket includes an arm extending substantially parallel to a longitudinal axis of the fuel tank and overlying a portion of the fuel tank.

8. The assembly of claim 1 wherein the bracket includes two arms extending substantially parallel to a longitudinal axis of the fuel tank and each overlying separate portions of the fuel tank.

9. The assembly of claim 8 wherein the arms are connected together by a bight that is exposed and extends outboard of the layer.

10. The assembly of claim 1 which also includes an isolator adapted to be disposed between the bracket and the vehicle when the fuel tank assembly is mounted to the vehicle.

11. The assembly of claim 1 wherein the bracket is generally L-shaped.

12. The assembly of claim 1 wherein the bracket is generally U-shaped.

13. The assembly of claim 1 wherein the layer includes a carbon or glass fiber inner layer and a fiberglass outer layer, and wherein the second portion of the bracket is located between the inner layer and the outer layer.

14. A fuel tank assembly, comprising:
   a fuel tank that is generally cylindrical and that has a central axis;
   a bracket connected to the fuel tank at one end and having another end accessible from the outside of the fuel tank to permit the assembly to be mounted to a vehicle, said one end of the bracket being displaced relative to said another end of the bracket upon deformation of the fuel tank so that changes to the fuel tank dimensions can be accommodated by the bracket, the bracket has an arm generally parallel to the axis of the fuel tank and the bracket is carried by the fuel tank along at least a portion of the arm.

15. The assembly of claim 14 wherein the bracket includes a plurality of brackets connected to the fuel tank at spaced locations with each being formed of a resilient material to accommodate changes in the fuel tank dimensions in use.

16. The assembly of claim 15 wherein the brackets are constructed and arranged so that the brackets more readily flex in one direction than another.

17. The assembly of claim 16 wherein the brackets are thinner in one dimension than another.

18. The assembly of claim 16 wherein the brackets are bent to control the location at and direction in which they flex.

19. The assembly of claim 14 wherein the bracket is generally L-shaped.

20. The assembly of claim 14 wherein the bracket is generally U-shaped.

21. A fuel tank assembly comprising:
   a fuel tank having at least a first layer of material that forms an interior for holding gaseous fuel, and the fuel tank having a second layer of material wrapped entirely around the first layer to form the structure of the fuel tank that holds fuel; and
   at least one bracket having an end located between the first layer and the second layer, whereby the second layer is also wrapped around the end to secure the bracket to the fuel tank.

22. The assembly of claim 21 wherein the second layer of material is a resinous fiber material.

23. A fuel tank assembly, comprising:
   a fuel tank;
   a bracket connected to the fuel tank at one end and having another end accessible from the outside of the fuel tank to permit the assembly to be mounted to a vehicle, said one end of the bracket being displaced relative to said another end of the bracket upon deformation of the fuel tank so that changes to the fuel tank dimensions can be accommodated by the bracket;
   wherein the fuel tank is generally cylindrical with a central axis, each bracket has an arm generally parallel to the axis of the fuel tank and each bracket is carried by the fuel tank along at least a portion of its arm;
   and wherein the fuel tank is defined at least in part by one or more composite layers of fibers and resin, and the bracket is disposed between adjacent composite layers.

* * * * *